(12) United States Patent
Levesque et al.

(10) Patent No.: US 7,406,766 B2
(45) Date of Patent: Aug. 5, 2008

(54) APPARATUS AND METHOD FOR ASSEMBLING A PART FOR AN AUTOMOTIVE VEHICLE

(75) Inventors: Michael Levesque, Cambridge (CA); Steven G Brown, Birmingham, MI (US); Guy W Boitos, Bloomfield, MI (US); Karem Akawi, Kitchener (CA)

(73) Assignee: BBI Enterprises, L.P., Bloomfield, MI (US)

( * ) Notice: Subject to any disclaimer, the term of this patent is extended or adjusted under 35 U.S.C. 154(b) by 558 days.

(21) Appl. No.: 10/968,505

(22) Filed: Oct. 19, 2004

(65) Prior Publication Data

US 2006/0080822 A1 Apr. 20, 2006

(51) Int. Cl.
*B23P 11/00* (2006.01)
*B23P 19/00* (2006.01)

(52) U.S. Cl. .......................... 29/897.2; 29/509; 29/525; 29/559; 29/709; 29/714; 29/715; 29/243.5; 29/281.1; 29/283.5; 29/464

(58) Field of Classification Search .............. 29/407.09, 29/407.1, 464, 466, 509, 513, 525, 559, 709, 29/714, 715, 717, 718, 721, 243.5, 244, 252, 29/281.1, 283.5, 897.2; 72/305, 308, 311, 72/312
See application file for complete search history.

(56) References Cited

U.S. PATENT DOCUMENTS

| | | | |
|---|---|---|---|
| 1,590,753 A * | 6/1926 | Hulbert | ........................ 29/505 |
| 4,312,255 A | 1/1982 | Holmstrom | |
| 4,346,579 A * | 8/1982 | Takatsu | ........................ 72/314 |
| 4,441,958 A | 4/1984 | Kiss | |
| 4,779,390 A | 10/1988 | Repper et al. | |
| 5,061,002 A | 10/1991 | Saso | |
| 5,076,880 A | 12/1991 | Spengler et al. | |
| 5,118,374 A | 6/1992 | Suwitoadji | |
| 5,318,647 A | 6/1994 | Mitchell | |
| 5,372,671 A | 12/1994 | Jorde | |
| 5,476,701 A | 12/1995 | Berger | |
| 5,830,518 A | 11/1998 | Oda | |
| 5,897,796 A * | 4/1999 | Forrest | ................... 219/121.64 |
| 6,029,334 A * | 2/2000 | Hartley | ........................ 29/464 |
| 6,052,887 A * | 4/2000 | Dziadosz et al. | ............... 29/509 |
| 6,287,678 B1 | 9/2001 | Spengler | |
| 6,397,651 B2 | 6/2002 | Usui et al. | |
| 6,474,125 B1 * | 11/2002 | Denis et al. | .................... 72/306 |
| 6,524,506 B2 | 2/2003 | Spengler | |

(Continued)

FOREIGN PATENT DOCUMENTS

EP 556015 A1 * 8/1993

*Primary Examiner*—Jermie E Cozart
(74) *Attorney, Agent, or Firm*—Howard & Howard Attorneys, P.C.

(57) ABSTRACT

An apparatus (10) of the present invention is designed for assembling a load floor (12) having a peripheral slot (22) and an overlaying layer (24, 28). The apparatus (10) tucks the overhang of the overlaying layer (24, 28) into the peripheral slot (22). At least one holding device (52) holds the load floor (12). At least one tucking tool (54) tucks the overhang of the overlaying layer (24, 28) into the peripheral slot (22) to fold the overhang over the peripheral slot (22) and thereafter tucking the overhang into the peripheral slot (22). The invention includes a method of sequentially folding and thereafter tucking the overhang of the overlaying layers (24, 28) into the peripheral slot (22).

49 Claims, 6 Drawing Sheets

U.S. PATENT DOCUMENTS 6,524,510 B2 2/2003 Spengler
6,708,462 B2 3/2004 Pokorzynski et al.
2003/0232160 A1* 12/2003 Spengler .................... 428/34.1
2004/0062904 A1 4/2004 Rice et al.

* cited by examiner

APPARATUS AND METHOD FOR ASSEMBLING A PART FOR AN AUTOMOTIVE VEHICLE

FIELD OF THE INVENTION

The subject invention relates generally to an interior vehicle component, which provides a structural surface. More particularly, the present invention relates toward an apparatus for making an interior trim component, such as, for example, a load floor, wherein the decorative covering of the load floor includes two different cover materials.

BACKGROUND OF THE INVENTION

The interior of motor vehicles, such as, for example, sport utility vehicles and station wagons, have trended toward improved functionality while not negatively affecting the overall mass and aesthetics of the vehicle. The progression of motor vehicles, such as, for example, sport utilities and station wagons, have included a desire to make full use of available space for storage. One such example is the inclusion of additional storage compartments located in the lower surface of a sport utility vehicle or station wagon. These storage compartments are concealed by a load floor, which must provide structural integrity to support the mass of heavy objects being transported in the rear of the vehicle on top of the load floor.

In the automotive industry, in addition to the aforementioned load floor, it has become known to use interior trim components such as interior door panels, dashboards, and the like having a decorative covering including two different cover materials on the same trim component. Such interior trim component having a two-part cover material are desired by consumers, for example to achieve a "two-tone effect" in which two different cover materials have different colors, or a high value or "luxury effect" in which each of the two different cover materials presents different types of materials such as a decorative cover film and a decorative cloth, or in which the different cover materials have different degrees of "soft touch" padding or the like.

In order to make such vehicle trim components having two-part cover materials, it has conventionally been the practice to splice together the two different cover materials before applying the spliced cover sheet onto a substrate of the interior trim component. The splicing of the two different cover materials has conventionally been carried out by thermal welding, adhesive bonding, or stitching. After the two different cover materials have been spliced together, it is generally necessary to hide or cover the splice line in order to hide the stitching or any adhesive overspill or the like. This is conventionally achieved by applying a trim strip, such as a strip of plastic, chrome, wood or the like, over the splice line on the finished interior trim component.

Alternatively, it has been attempted to press the splice line into a groove provided in the substrate in order to hide the splice line in this manner.

The above described conventional practices and the resulting interior trim component having a two-part cover material suffer many disadvantages, including the following. The preliminary process of splicing together the two different cover materials involves extra processing and handling steps, which translates into increased costs and a greater likelihood of defective parts leading to a higher reject rate. Furthermore, the application of the trim strip to hide the splice line on the finished door panel, dashboard or the like requires extra steps and extra materials, which again lead to higher costs and higher defect rates.

Alluding to the above, the aforementioned load floors have been used when provide a more elegant appearance. Previous attempts to provide such a functional/aesthetically pleasing load floor have resulted in a peripheral edge that is unfinished and visibly unattractive. Occasionally, an additional covering is provided and completely conceals the load floor from the passenger compartment. Therefore, it would be desirable to produce a lightweight, functional load floor at a low cost having a finished peripheral surface that is aesthetically pleasing. One preferred method of providing a peripheral surface having an aesthetically pleasing appearance requires that a first fabric or decorative material and a second fabric or functional material be mated at the periphery where the perimeter edge of each of the materials is concealed in a slot. This presents various technical difficulties that have resulted in costly manufacturing processes to provide the desired aesthetically pleasing peripheral edge.

One such example is disclosed in the U.S. Pat. No. 5,061,002 to Saso teaching a partition plate for an automotive vehicle, in particular for a luggage compartment of the automotive vehicle, wherein the partition plate is detachable from the automotive vehicle and serves as a table of a reversible type in the outdoors. The partition plate includes a board presenting opposite surface with one surface covered with a carpet. The peripheral section of the carpet extends to a side peripheral surface of the board and is covered with a garnish secured on the other surface of the board. A costly garnish molding is applied over the peripheral edge of the carpet.

Various other attempts have been made to provide an aesthetically pleasing peripheral edge to other components such as, for example, table top pads. The U.S. Pat. No. 5,476,701 to Berger teaches a panel having a core defining a slot. The core is covered by a fabric where adhesive is used to retain peripheral edges of the fabric covering the core within the slot. The application of adhesive in the slot to retain the fabric is known to be a difficult manufacturing process that is proven not viable due to the propensity of the adhesive to be spread over the visible surface of the table pad. Furthermore, forming a slot in a core material is known to require costly molding tools having sliding components, particularly for molded cores. As disclosed in U.S. Pat. No. 5,476,701 to Berger, the slot is cut into the core with a common table saw, which is not practicable when manufacturing high production volumes. Alluding to the above, other additional methods and designs for tucking covering materials are currently used in the automotive industry. Such methods and designs, disclosed in the U.S. Pat. No. 4,441,956 to Kiss; U.S. Pat. No. 5,830,508 to Oda; U.S. Pat. No. 6,524,506 to Spengler; and U.S. Pat. No. 6,524,500 to Spengler.

But even with the aforementioned methods and designs, to the extent it is effective, there is always need for improvements in an apparatus for forming improved interior components, such as, for example a load floor for an automotive vehicle having the functional flexibility of a decorative surface and a functional surface while providing an aesthetically pleasing peripheral edge at a low cost.

SUMMARY OF THE INVENTION

An apparatus of the present invention is designed for assembling a panel having opposite surfaces, sides interconnected by corners and a peripheral slot defined therein. The apparatus tucks an overlaying layer extending over one of the opposite surfaces into the peripheral slot. A clamping assembly of the apparatus holds the panel. At least one tucking tool tucks the overhang of the overlaying layer into the peripheral slot. An actuation system of the apparatus effects relative movement between the panel and at least one tucking tool in a direction transverse to the opposite surfaces of the panel. The tucking tool is disposed in overlapping relationship with the overhang to fold the overhang over the peripheral slot and for thereafter effecting relative movement in a direction parallel to the opposed surfaces of the panel to move the tucking tool into the peripheral slot to tuck the overhang into the peripheral slot. The invention includes a method of sequentially folding and thereafter tucking the overhang of the overlaying layer into the peripheral slot.

An advantage of the present invention is to provide an actuation system for assembling the load floor, which includes a plurality of tucking tools for sequentially tucking the sides and corners of the panel.

Another advantage of the present invention is to provide the pushing devices cooperable with the tucking tools to form an actuation system, wherein the pushing devices are retractably movably relative to one and the other for sequentially folding and thereafter tucking the overhang of the overlaying layer into a peripheral slot.

Still another advantage of the present invention is to provide a method of sequentially folding and thereafter tucking the overhang of the overlaying layer into a peripheral slot thereby forming an aesthetically pleasing peripheral edge in an adhesive free manner at a low cost and at a high volume.

DESCRIPTION OF THE INVENTION

Figure 1:
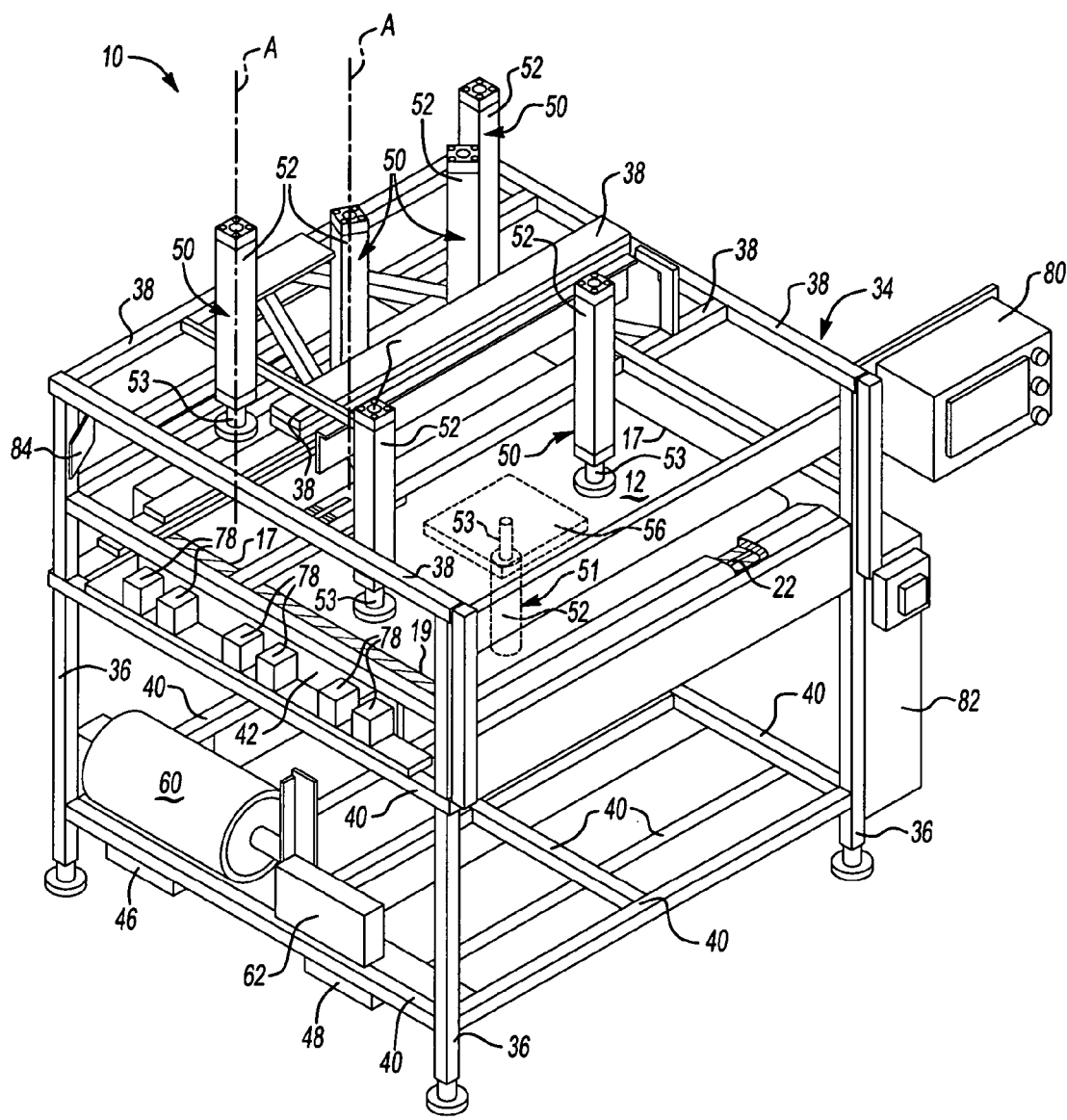
FIG. 1 shows a perspective view of an inventive apparatus.

Referring to FIG. 1, an inventive apparatus of the present invention is generally shown at 10. The apparatus 10 is designed for assembling an interior component for an automotive vehicle (not shown) such as, for example, a load floor panel or assembly 12. The load floor 12 is typically used in the rear of a station wagon or sport utility vehicle (not shown) to cover a compartment used for storage while providing structural support capable of supporting heavy objects (not shown) being transported in the station wagon or sport utility vehicle.

Figure 2:
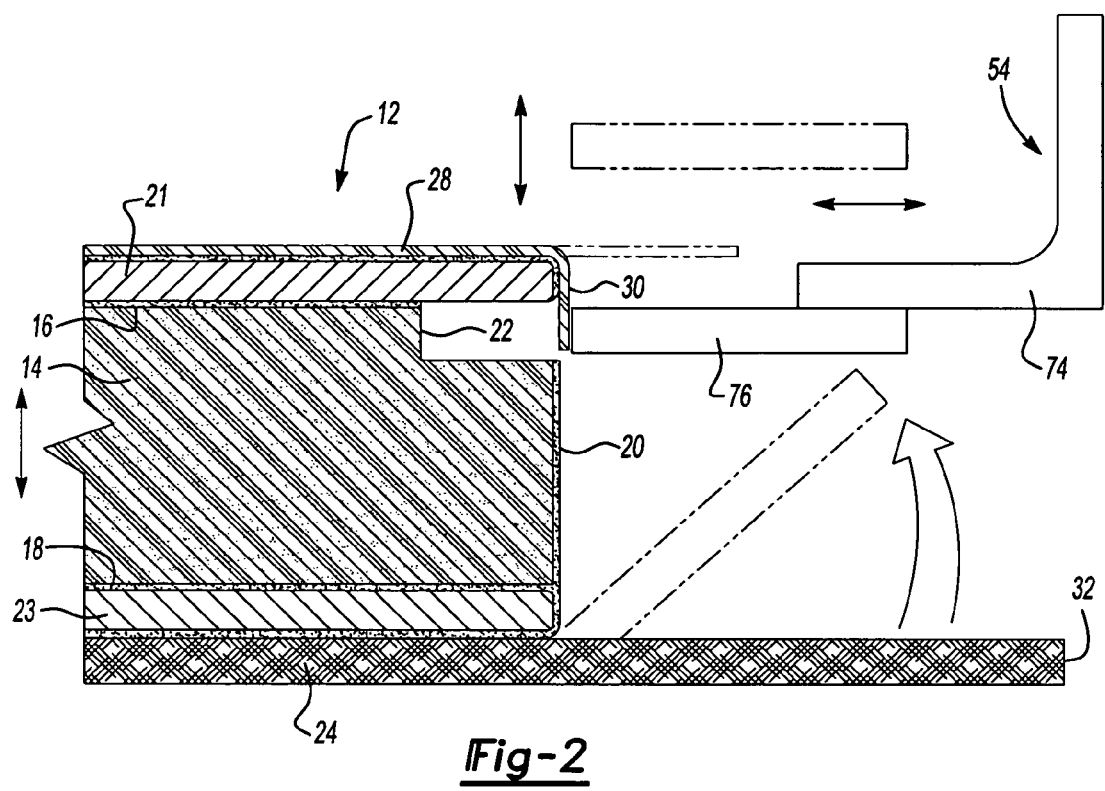
FIG. 2-4 show partial cross sectional views of a tucking process for the load floor wherein a tucking tool sequentially folds cover layers into a slot defined in a core component of the load floor.
Figure 3:
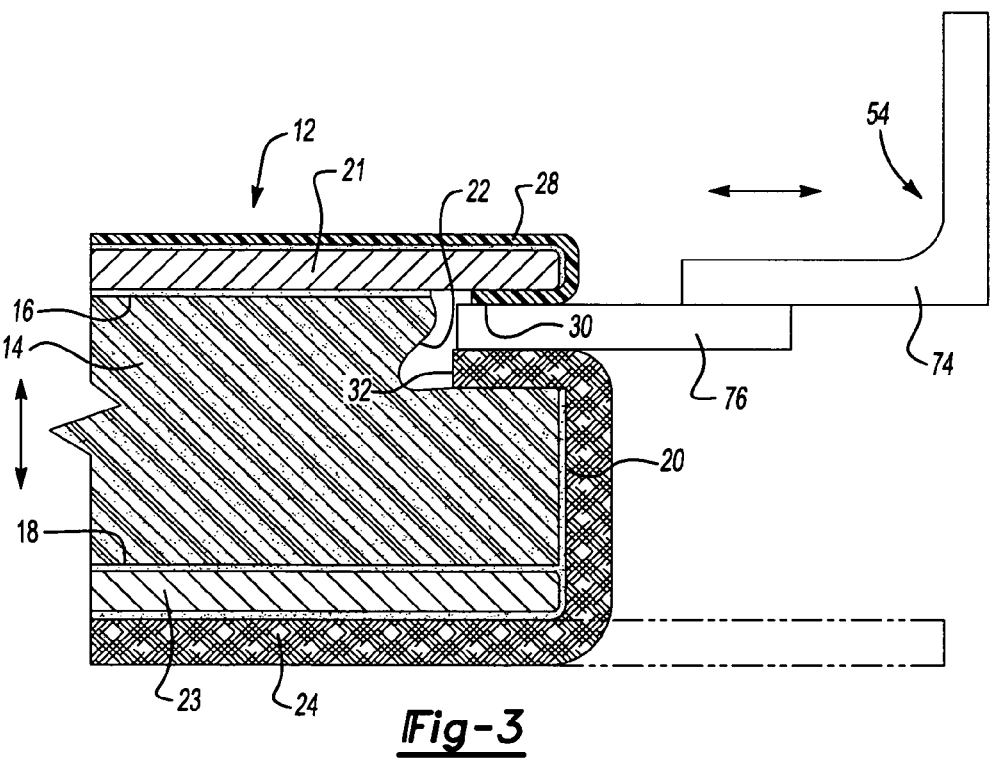
Figure 4:
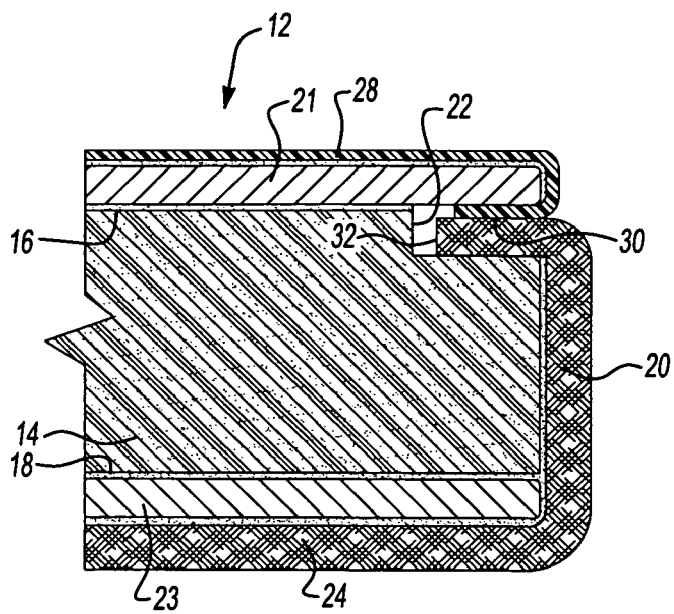
Figure 6:
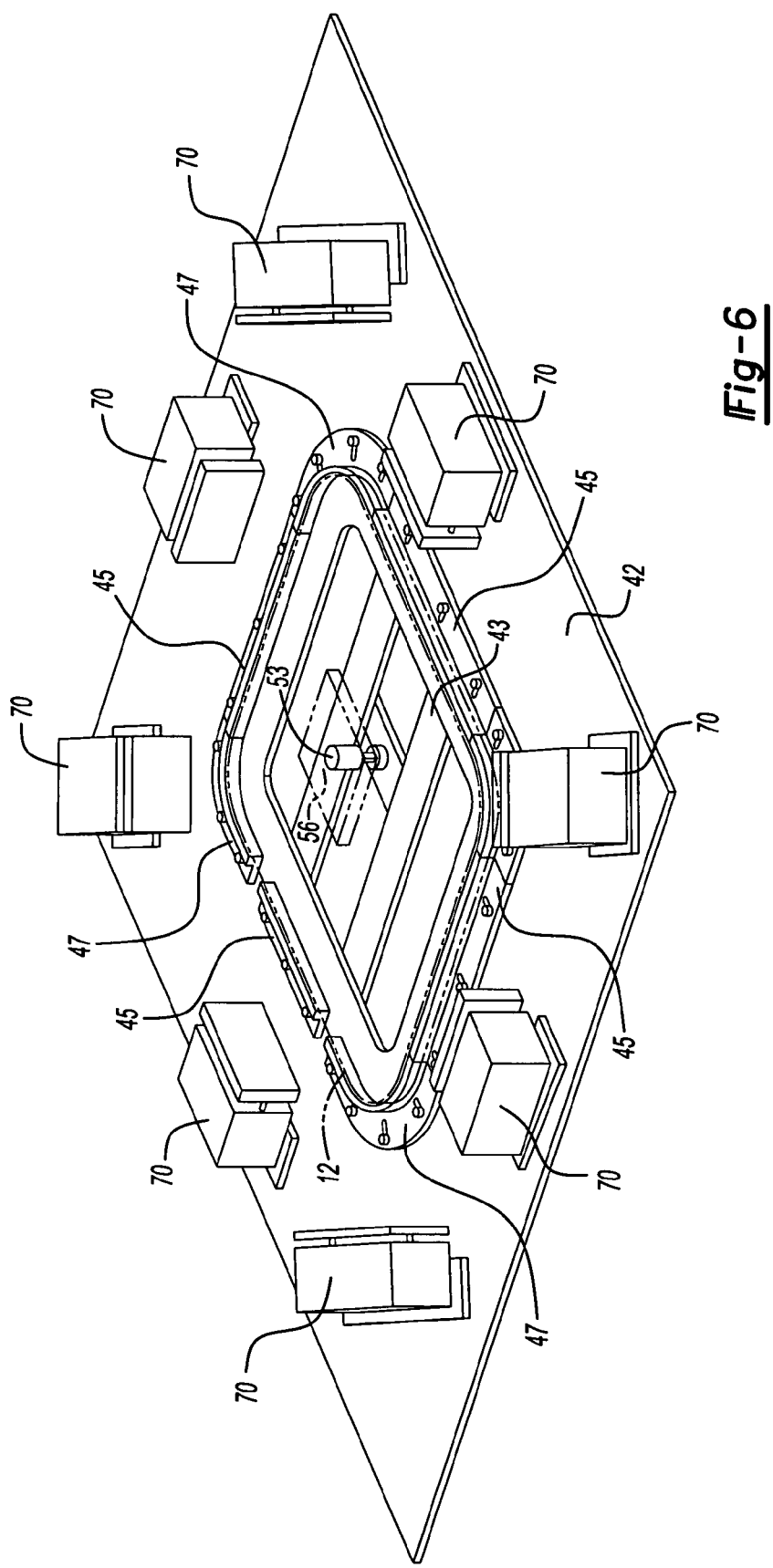
FIG. 6 shows a perspective view of a support frame of the apparatus with an opening defined therein and a plurality of adjustable retainers surrounding the opening for holding the load floor, shown in phantom.
Figure 7:
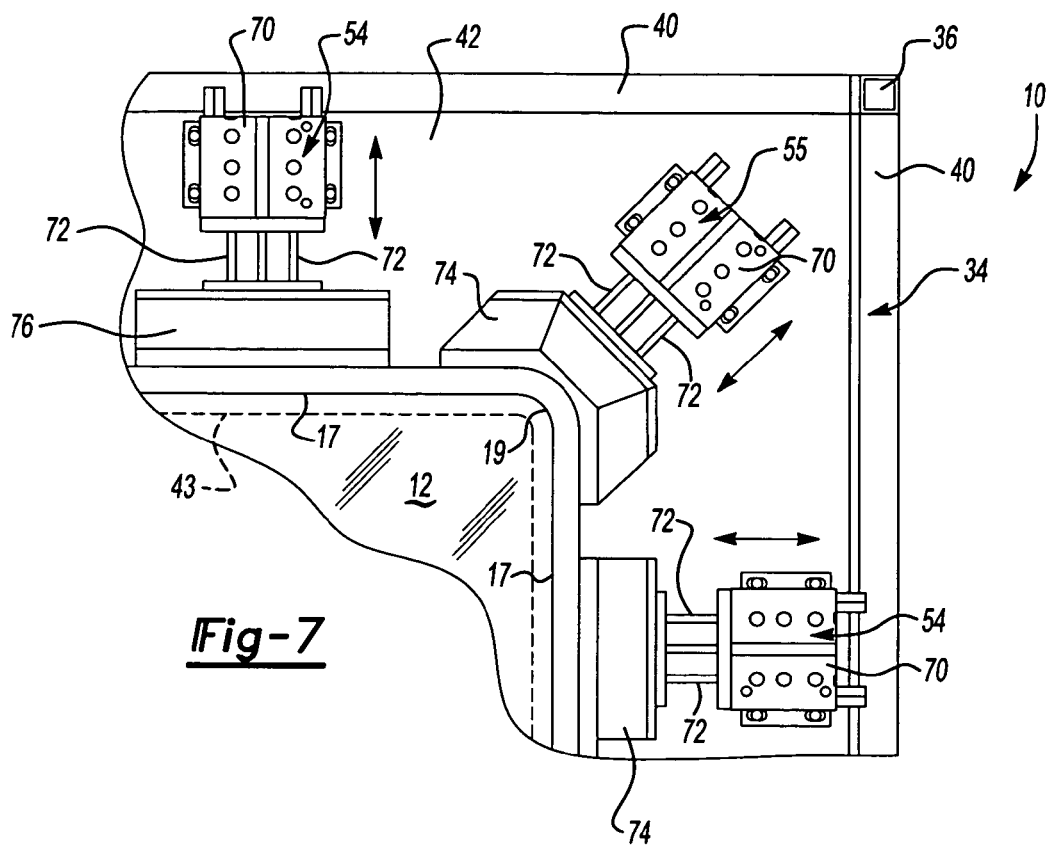
FIG. 7 shows a partial top view of the side and corner tucking tools movable transversely to the load floor from an isolated position.

Referring to FIGS. 2 through 4, the load floor 12 includes a core component 14, formed as a generally planar sheet panel. The core component 14 includes opposite surfaces 16 and 18 each extending into a peripheral edge 20 having a peripheral slot 22 defined therein. Preferably, the core component 14, if formed from a foamed or equivalent light weight material, such as, for example, polystyrene, and provides a desirable dimensional configuration to the load floor 12. The load floor 12 further presents sides 17 interconnected by corners 19, as best shown in FIGS. 6 and 7. The core component 14 is preferably formed of a low density material to reduce the mass of the load floor 12. A pair of reinforcing layers 21 and 23 are attached to opposite surfaces 16 and 18 of the core component 14. Each reinforcing layer 21 and 23 is preferably formed from a hard board or equivalent rigid substrate to provide further structural integrity to the load floor 12. Other substrates such as, for example, rigid polymeric materials may also be selected such as, for example, polyvinylchloride, reinforced polypropylene, or other equivalent extruded materials may be selected.

The load floor 12 includes a functional surface defined by a first layer 24 and a decorative surface defined by a second layer 28. Preferably, the first layer 24 is formed from a polymeric fabric such as, for example, vinyl or other easily cleanable material for removing contaminants. Furthermore, the second layer 28 is formed from a carpet or equivalent decorative fabric and is exposed for aesthetically appearance when not hauling contaminated materials in the rear of the vehicle. Each of the first 24 and second 28 layers extend to overlaying edges 30 and 32, respectively, and continuously extend over the opposite surfaces 16 and 18 of the core component 14, respectively. The functional fabric and the decorative fabric form a seam along the peripheral edge 20 of the load floor 12. The seam provides an aesthetically pleasing transition between the first 24 and second 28 layers.

Figure 5:
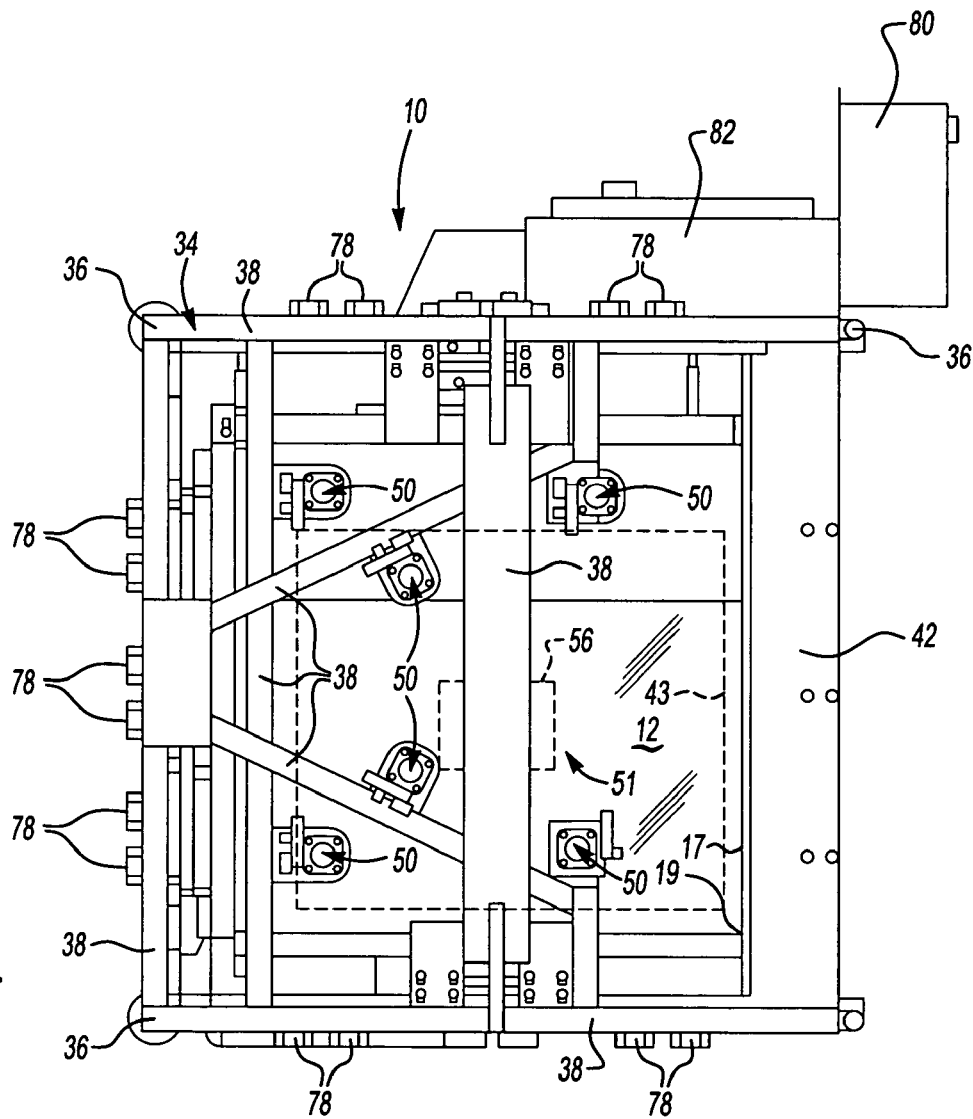
FIG. 5 shows a top view of the apparatus.

As best shown in FIGS. 1 and 5, the apparatus 10 includes a frame, generally indicated at 34, presenting a plurality of vertical posts 36 interconnected by a plurality of upper horizontal beams 38 and a plurality of lower horizontal beams 40. A support panel 42 is connected to one of the lower horizontal beams 40. The support panel 42 includes an opening 43, shown in phantom in FIGS. 7 and 8, preferably of a rectangular configuration defined in the support panel 42. The opening 43 is smaller in its dimentions as compared with the perimeter of the load floor 12 as the load floor is partially supported by the support panel 42. The support panel 42 is connected to one of the lower horizontal beams 40. A plurality of side and corner retaining elements 45 and 47 are adjustably connected to the support panel 42 surrounding the opening 43, as shown in FIG. 6. The side and corner retaining elements 45 and 47 are slidably movable to and away from the opening 43 to hold the load floor 12, shown in phantom in FIG. 6, relative to the support panel 42 in a non-movable position, before tucking operation begins. The side and corner retaining elements 45 and 47 are adjustably adaptable to accommodate the load floor 12 of various dimensions. A pair of fork-lift sleeves 46 and 48 are connected to the frame 34 to receive forks of a fork-lift truck (not shown) for moving the apparatus 10 between various locations.

Figure 10:
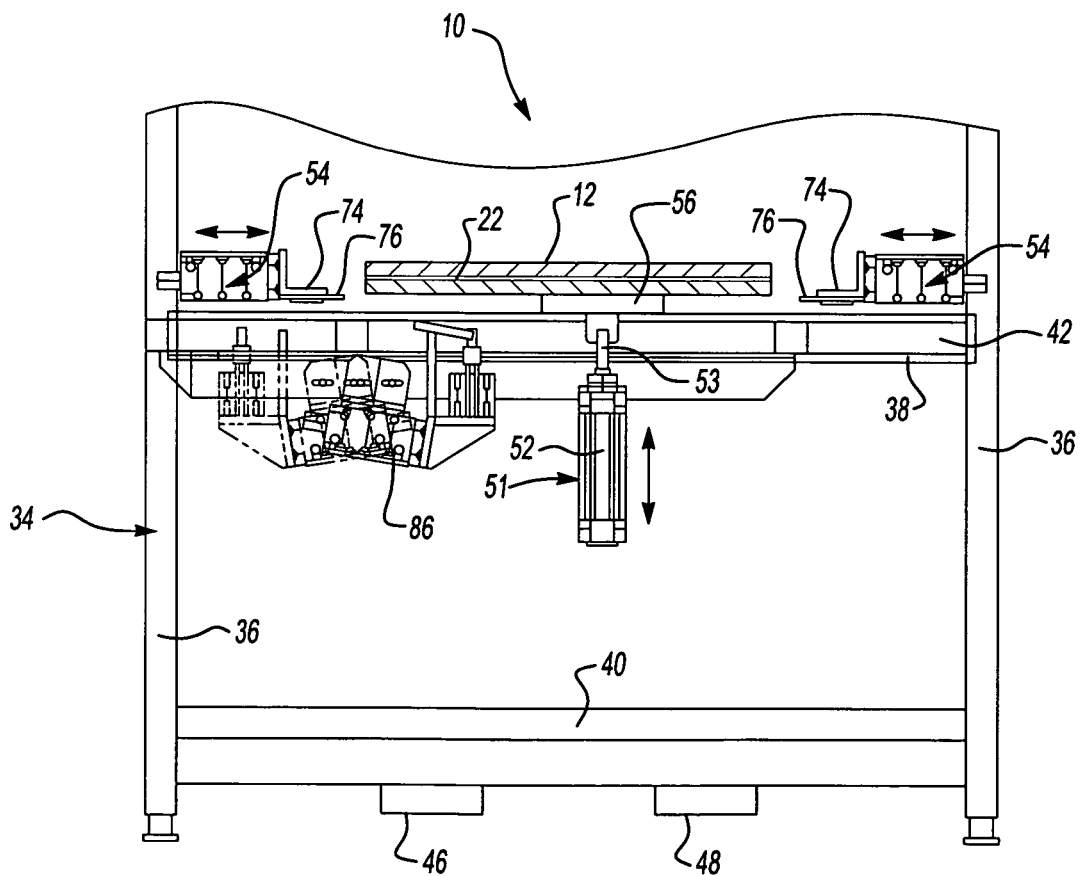
FIG. 10 shows a cross sectional view of the apparatus showing an ejector and a device for inserting a handle into the load floor.

An actuation system of the apparatus 10 includes a clamping assembly defined by a plurality of upper actuators or pushing devices, each generally indicated at 50 in FIGS. 1 and 5, and at least one bottom actuator or ejector, generally indicated at 51 in FIGS. 1 and 10. The pushing devices 50 and the ejector 51 extend through the opening 43 with respect to different tucking modes of the apparatus 10. A support plate 56 is connected to ejector 51. The support plate 56 holds the load floor 12 positioned on the support plate 56. The pushing devices 50 and the ejector 51 clamp the load floor 12 therebetween for moving the load floor 12 relative to the support panel 42 as the pushing devices 50 and the ejector 51 move in unison along a longitudinal axis A (only two are shown for illustration purposes in FIG. 1) extending perpendicular to the support panel 42. The pushing devices 50 are spaced around the perimeter of the load floor 12 and are connected to the frame 34.

Each pushing device 50 and the ejector 51 includes a housing 52 and a piston 53 disposed in the housing 52. Each pushing device 50 and the ejector 51 are connected to a source of fluid supply, such as, for example, an air supply tank 60 cooperable with a pneumatic panel 62 to monitor the level of fluid supply. The pushing device 50 and the ejector or lower actuator 51 may include a back-up source of fluid supply (not shown). Preferably, each pushing device 50 and the ejector 51 is a pneumatic actuator of the kind. Those skilled in the mechanical art will appreciate that various other mechanical actuators may be used for moving the load floor 12 relative to the support panel 42. These other mechanical actuators include and are not limited to electric actuators, hydraulic actuators, or the like.

Figure 8:
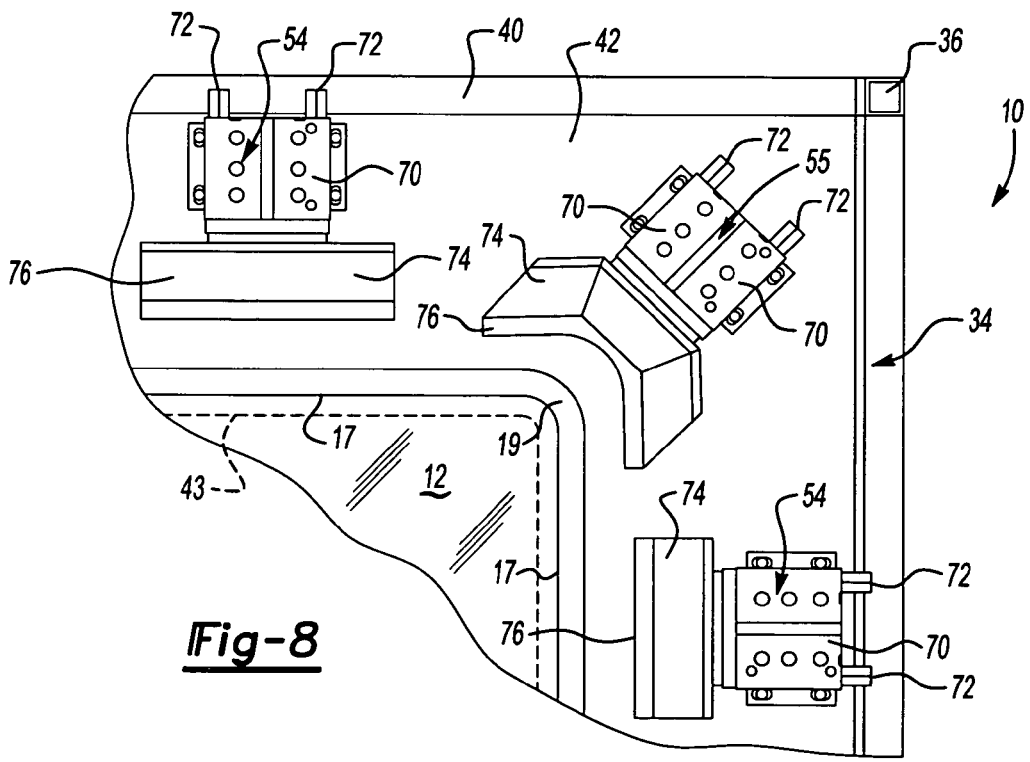
FIG. 8 shows a partial top view of the side and corner tucking tools shown in FIG. 7 with the side and corner tucking tools retractably movable back to the isolated position after the process of tucking the layers into the slot is complete.

Alluding to the above, the apparatus 10 includes a plurality of tucking tools, such as a side tucking tool and a corner tucking tool, generally indicated at 54 and 55, respectively, in FIGS. 6 through 8. The side tucking tools 54 are connected to the support panel 42. The corner tucking tools 55 are spaced between the side tucking tools 54 for tucking corners 19 of the load floor 12. The side and corner tucking tools 54 and 55 are spaced from one another surrounding the peripheral edge 20 of the load floor 12 for tucking the sides 17 and the corners 19 of the load floor 12, respectively. The side and corner tucking tools 54 and 55 are movable into overlaping relationship with the overhang of the overlaying edges 30 and 32 for effecting relative movement between the load floor 12 and the side and corner tucking tools 54 and 55 in a direction transverse to the peripheral slot 22. The side and corner tucking tools 54 and 55 fold the overhang over the peripheral slot 22 and thereafter tuck the overhang into the peripheral slot 22. The side and corner tucking tools 54 and 55 are connected to the support panel 42. Each of the side and corner tucking tools 54 and 55 is transversely oriented relative the longitudinal axis A. Each of the side and corner tucking tools 54 and 55 is retractably and transversely movable from an isolated position perpendicularly to the longitudinal axis A as the load floor 12 is moved between a first, i.e. an upper and a second, i.e. lower positions of the pushing devices 50 for sequentially forcing the first and second layers 24 and 28 into the peripheral slot 22 for retaining the first and second layers 24 and 28 in the peripheral slot 22 in an adhesive free manner.

Figure 9:
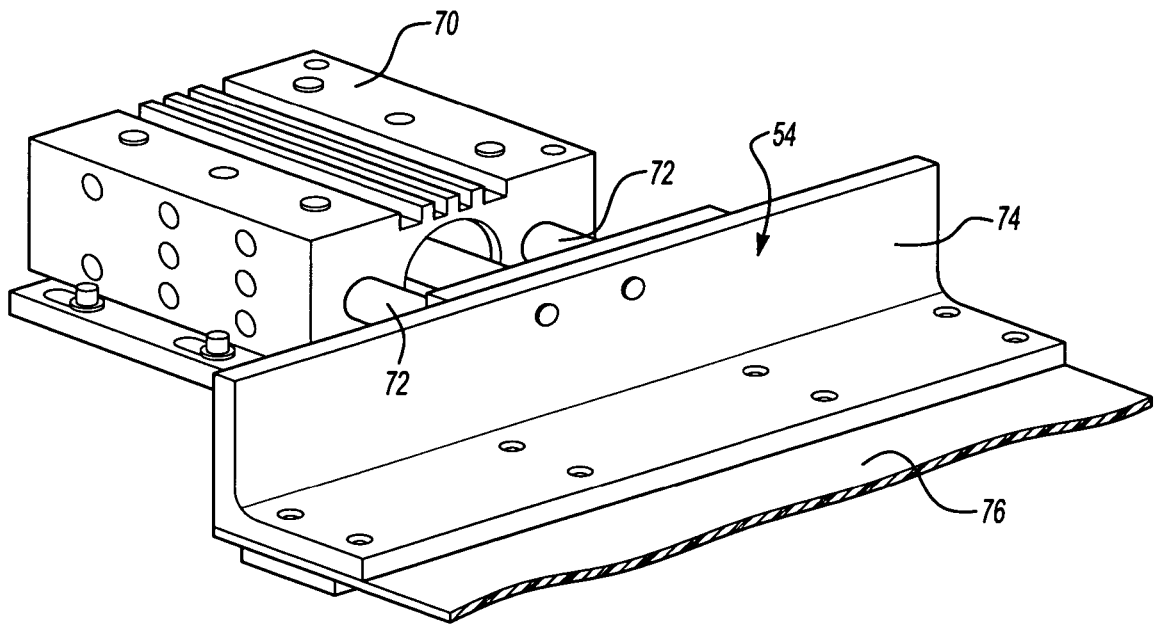
FIG. 9 is a perspective view of the tucking tool showing a tucking actuator and a blade support connected to a blade with the blade support operably engaged with the tucking actuator.

As best shown in FIG. 7 and 8, each side and corner tucking tool 54 and 55 is operably connected to a tucking actuator defined by a pneumatically operated cylinder 70 having a pair of shafts, shown at 72 in FIG. 9, horizontally slidable relative the longitudinal axis A. A blade support 74 is connected to the shafts 72. A tucking blade 76 is supported by the blade support 74 for tucking the overhang edges 30 and 32 of the first and second layers 24 and 28 into the peripheral slot 22. The side and corner tucking tools 54 and 55 may present various configurations, such as, for example, convex, concave, or straight, to accommodate load floor 12 of different configurations and designs for different models of various automotive vehicles (not shown).

The side and corner tucking tools 54 and 55 are fluidly communicated with the aforementioned source of fluid supply 60 for supplying fluid and facilitating pneumatical motion of the side and corner tucking tools 54 and 55. A plurality of sensor 78 of the apparatus 10 are connected to each tucking actuators or cylinders 70, as shown in FIGS. 1 and 5, and to each of the pushing devices 50 and the ejector 51 (no sensors 78 are shown connected to the the upper actuators or pushing devices 50) for controlling operational modes of the pushing devices 50 and the ejector 51 and the tucking actuators or cylinders 70.

Preferably, a controller, shown at 80 in FIG. 1, is connected to the apparatus 10 for sequencing the movement of the pushing devices 50, the ejector 51, and the tucking actuators or cylinders 70 relative to one another and relative to the load floor 12. The controller 80 is electronically connected to the pneumatically operated tucking actuator or cylinder 70 of the side and corner tucking tools 54 and 55 and the pushing devices 50 for regulating various operational modes of the tucking tools 54 and 55, the pushing devices 50, and the ejector 51. The controller 80 includes a computer having an input/output interface, a central processor unit, a random access memory, i.e. RAM, and a read only memory, i.e. ROM. The input interface is electrically connected with the side and corner tucking tools 54 and 55, the ejector 51, and the pushing devices 50 of the apparatus 10. The controller 80 is preprogrammed with the various configurations of the load floor 12. The ROM stores a program, i.e. a comparative software that determines proper amount of fluid, i.e. air to be supplied to each tucking actuator or cylinder 70 and the pushing devices 50 with respect to different operational modes of the apparatus 10. The controller 80 is preferably connected to the frame 34 at an operational point (not shown). Alternatively, the controller 80 may be positioned adjacent the frame 34.

A source of electricity supply 82 is adjacent the controller 80 and is electrically connected to the controller 80 and all other electrically operated components of the apparatus 10. At least one mirror 84 is connected to the frame 34 for reflecting images of the load floor 12 as the tucking tools 54 and 55 move relative to the load floor 12. Preferably, the apparatus 10 may include a device or tool 86 operably connected to the frame 34 and pivotably and radially rotatable relative the load floor 12 for forming a cavity (not shown) therein and inserting a handle (not shown) into the cavity. The tool 86 is fluidly connected to the air supply tank 60 and is electronically connected to the controller 80.

The invention includes a method of assembling the load floor 12. When the tucking cycle of the method begins, as referring back to FIGS. 2 through 4, the pushing devices 50 and the ejector 51 hold the load floor 12 in a horizontal orientation relative to the support frame 42 with the load floor 12 being clamped between the pushing devices 50 and the ejector 51. As regulated by the controller 80 adaptable to recognize various types and modifications of the load floor 12, the pushing devices 50 and the ejector 51 are moved in unison to position the load floor 12 in the transverse direction relative to the operational movement of the side and corner tucking tools 54 and 55 with respect to different tucking modes, i.e. first and second tucking modes, of the present method to sequentially tuck the first and the second layers 24 and 28.

In the first tucking mode of the present method, as the pushing devices 50 and the ejector 51 with the load floor 12 clamped therebetween lift the load floor 12 away from the support panel 42, the side tucking tools 54 are slidably moveable in the direction transverse to the peripheral slot 22 thereby catching the overlaying edge 32 of the second layer 28 and folding the overlaying edge 32 of the second layer 28 towards the peripheral slot 22 at the sides 17 of the load floor 12. The side tucking tools 54 are then moved transversely and further into the peripheral slot 22 to tuck the second layer 28 therein, when the peripheral slot 22 is leveled or is positioned horizontally with the tucking blade 76. This folding mode is followed by slidable movement of the corner tucking tools 55 in the direction transverse to the peripheral slot 22 to catch the overlaying edge 32 of the second layer 28 at the corners 19 and to fold the overlaying edge 32 of the second layer 28 to the peripheral slot 22 at the corners 19 of the load floor 12. The corner tucking tools 55 are then moved transversely and further into the peripheral slot 22 to tuck the overlaying edge 32 of the second layer 28 therein, when the peripheral slot 22 is leveled or is positioned horizontally with the tucking blade 76. Alternatively, both side and corner tucking tools 54 and 55 may perform tucking function in unison.

After the tucking of the second layer 28 of the present method is complete, the corner and side tucking tools 54 and 55, coordinated by the controller 80, are slightly retracted back and just enough to allow the pushing devices 50 and the ejector 51 to lift the load floor 12 upwardly enough for the first layer 24 to pass the tucking blade 76 thereby presenting an overlapping engagement of the overlaying edges 30 first layer 24 with the tucking blade 76. The pushing devices 50 and the ejector 51 then lower the load floor 12 just enough for the side and corner tucking tools 54 and 55 to sequentially fold and tuck the first layer 24 into the peripheral slot 22 in the aforementioned fashion to mechanically engage the first and second layers 24 and 28 in the peripheral slot 22 in an adhesive free manner therein thereby forming an aesthetically pleasing surface while further providing an aesthetically pleasing peripheral edge 20. When the tucking of the first and second layers 24 and 28 is complete, the pushing devices 50 are retracted away from the load floor 12. The ejector 51 lifts the load floor 12 above the support panel 42 to allow the load floor 12 to be removed from the apparatus 10 by an operator (not shown).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for assembling a panel having opposite surfaces and sides interconnected by corners and having a peripheral slot defined therein and at least one overlaying layer extending over one of the opposite surfaces and for tucking the overhang of the overlaying layer into the peripheral slot, said apparatus comprising;

an actuation system having a clamping assembly for holding the panel, and at least one tucking tool of said actuation system having a tucking blade for tucking the overhang into the peripheral slot and effecting relative movement between the panel and said at least one tucking tool in a direction transverse to the opposite surfaces of the panel with said at least one tucking tool disposed in overlapping relationship with the overhang to fold the overhang over the peripheral slot and for thereafter effecting relative movement in a direction parallel to the opposite surfaces of the panel to move said at least one tucking tool into the peripheral slot to tuck the overhang into the peripheral slot.

2. An apparatus as set forth in claim 1 wherein said clamping assembly includes panel actuators for effecting said relative movement between the panel and said at least one tucking tool in said transverse direction.

3. An apparatus as set forth in claim 2 wherein said at least one tucking tool is further defined by a plurality of said tucking tools spaced one from the other for surrounding the panel about the peripheral slot.

4. An apparatus as set forth in claim 3 wherein each of said plurality of tucking tools includes a tucking actuator for moving said plurality of tucking tools parallel to the panel.

5. An apparatus as set forth in claim 4 including a controller for sequencing said panel actuators and said tucking actuators relative to one another and relative to the panel.

6. An apparatus as set forth in claim 5 wherein said plurality of tucking tools is further defined by a plurality of side tucking tools for tucking the overhang of the overlaying layer into the peripheral slot about the sides of the panel and a plurality of corner tucking tools for tucking the overhang of the overlaying layer into the peripheral slot about the corners of the panel.

7. An apparatus as set forth in claim 6 wherein said panel actuators of said clamping assembly are further defined by a plurality of pushing devices for applying a force to one of the opposite surfaces thereby pushing the panel in said transverse direction.

8. An apparatus as set forth in claim 7 wherein said panel actuators of said clamping assembly are further defined by at least one ejector for supporting the other of the opposite surfaces for moving the panel clamped therebetween in unison with said pushing devices as sequenced by said controller in different tucking modes of said apparatus.

9. An apparatus as set forth in claim 8 wherein each said panel actuator is a pneumatic actuator.

10. An apparatus as set forth in claim 5 wherein each tucking actuator is a pneumatic actuator having a pneumatically operated cylinder and a pair of spaced shafts horizontally movable relative to the panel.

11. An apparatus as set forth in claim 10 wherein each tucking tool includes a blade support connected to said spaced shafts.

12. An apparatus as set forth in claim 10 wherein said tucking blade is supported by said blade support for tucking the overhang of the overlaying layer into the peripheral slot.

13. An apparatus as set forth in claim 12 including a source of a fluid supply fluidly communicated with said tucking actuators, said panel actuators for supplying fluid and facilitating pneumatical motion of said tucking actuators and said panel actuators.

14. An apparatus as set forth in claim 13 wherein said tucking blade presents a planar configuration.

15. An apparatus as set forth in claim 13 wherein said tucking blade presents a concave configuration.

16. An apparatus as set forth in claim 13 wherein said tucking blade presents a convex configuration.

17. An apparatus as set forth in claim 13 including a frame presenting a plurality of vertical posts interconnected by upper and lower horizontal beams.

18. An apparatus as set forth in claim 17 including a support panel connected to said frame for supporting the panel.

19. An apparatus as set forth in claim 18 wherein said support panel presents an opening defined therein with said opening being smaller than the perimeter of the panel with said pushing devices and said at least one ejector extending through said opening with respect to different tucking modes of said apparatus.

20. An apparatus as set forth in claim 19 including side and corner retaining elements adjustably connected to said support panel and suffounding said opening for holding the panel relative said support panel with said side and corner retaining elements slidably movable relative said opening.

21. An apparatus as set forth in claim 20 wherein said pushing devices are operably connected to said upper horizontal beams and oriented around the perimeter of the panel.

22. An apparatus as set forth in claim 21 including a sensor connected to each of said panel actuators and said tucking actuators for controlling tucking modes of said panel actuator and tucking actuators.

23. An apparatus as set forth in claim 22 including at least one mirror connected to said frame for reflecting images of the panel as said tucking tools move relative to the panel.

24. An apparatus as set forth in claim 23 including a pair of sleeves connected to said lower horizontal beams for receiving forks of a fork-lift truck.

25. An apparatus as set forth in claim 24 including a device operably connected to said lower horizontal beam with said device pivotably and radially rotatable relative the panel for forming a cavity in the panel and inserting a handle into the cavity of the panel.

26. A method for assembling a panel having opposite surfaces and sides interconnected by corners and having a peripheral slot defined therein and at least one overlaying layer extending over one of the opposite surfaces and for tucking the overhang of the overlaying layer into the peripheral slot, said method comprising the steps of;
providing a clamping assembly to clamp the panel on the opposite surfaces,
providing at least one tucking tool to tuck the overhang into the peripheral slot, and
sequentially moving the clamping assembly and the at least one tucking tool relative to one another and in a direction transverse to the opposite surfaces of the panel to dispose the overhang in overlapping relationship with the at least one tucking tool and to force the overhang into the peripheral slot thereby retaining the overhang of each layer in the peripheral slot in an adhesive free manner.

27. A method as set forth in claim 26 including the step of folding the overhang over the peripheral slot.

28. A method as set forth in claim 27 wherein the step of folding the overhang over the peripheral slot is further defined by the step of moving the at least one tucking tool into the peripheral slot and to tuck the overhang into the peripheral slot.

29. A method as set forth in claim 28 wherein the step of providing at least one tucking tool is further defined by providing a plurality of the tucking tools spaced one from the other to suffound the panel about the peripheral slot.

30. A method as set forth in claim 26 wherein the step of providing the clamping assembly is further defined by providing a plurality of pushing devices to apply a force to one of the opposite surfaces to push the panel in the transverse direction.

31. A method as set forth in claim 30 wherein the step of providing the clamping assembly is further defined by providing at least one ejector to support the other of the opposite surfaces and to move the panel clamped between the pushing devices and the ejector in unison in different tucking modes of said method.

32. A method as set forth in claim 31 including the step of connecting a sensor to each of the pushing devices and each of the tucking tools, and to the ejector to control tucking modes of the pushing devices, the tucking tools, and the ejector.

33. A method as set forth in claim 32 including the step of connecting a controller to the pushing devices, the tucking tools, and the ejector to sequence movement of the pushing devices, the tucking tools, and the ejector relative to one another and relative to the panel.

34. A method as set forth in claim 33 including the step of connecting a source of a fluid supply to the pushing devices, the tucking tools, and the ejector to supply fluid and facilitating pneumatical motion of the tucking tools, the pushing devices, and the ejector.

35. An apparatus for assembling a panel having opposite surfaces and sides interconnected by corners and having a peripheral slot defined therein and at least one overlaying layer extending over one of the opposite surfaces and for tucking the overhang of the overlaying layer into the peripheral slot, said apparatus comprising;
an actuation system having a clamping assembly for holding the panel, and
at least one tucking tool of said actuation system for tucking the overhang into the peripheral slot and effecting relative movement between the panel and said at least one tucking tool in a direction transverse to the opposite surfaces of the panel with said at least one tucking tool disposed in overlapping relationship with the overhang to fold the overhang over the peripheral slot and for thereafter effecting relative movement in a direction parallel to the opposite surfaces of the panel to move said at least one tucking tool into the peripheral slot to tuck the overhang into the peripheral slot;
said clamping assembly including panel actuators for effecting said relative movement between the panel and said at least one tucking tool in said transverse direction;
said at least one tucking tool being further defined by a plurality of said tucking tools spaced one from the other for suffounding the panel about the peripheral slot, wherein each of said plurality of tucking tools includes a tucking actuator for moving said plurality of tucking tools parallel to the panel;
a controller for sequencing said panel actuators and said tucking actuators relative to one another and relative to the panel;
said plurality of tucking tools being further defined by a plurality of side tucking tools for tucking the overhang of the overlaying layer into the peripheral slot about the sides of the panel and a plurality of corner tucking tools for tucking the overhang of the overlaying layer into the peripheral slot about the corners of the panel;
said panel actuators of said clamping assembly are further defined by a plurality of pushing devices for applying a force to one of the opposite surfaces thereby pushing the panel in said transverse direction and at least one ejector for supporting the other of the opposite surfaces for moving the panel clamped therebetween in unison with said pushing devices as sequenced by said controller in different tucking modes of said apparatus with each said panel actuator being a pneumatic actuator; and
each tucking actuator is a pneumatic actuator having a pneumatically operated cylinder and a pair of spaced shafts horizontally movable relative to the panel with each tucking tool including a blade support connected to said spaced shafts.

36. An apparatus as set forth in claim 35 wherein each tucking tool includes a tucking blade is supported by said blade support for tucking the overhang of the overlaying layer into the peripheral slot.

37. An apparatus as set forth in claim 36 including a source of a fluid supply fluidly communicated with said tucking actuators, said panel actuators for supplying fluid and facilitating pneumatical motion of said tucking actuators and said panel actuators.

38. An apparatus as set forth in claim 37 wherein said tucking blade presents a planar configuration.

39. An apparatus as set forth in claim 38 wherein said tucking blade presents a concave configuration.

40. An apparatus as set forth in claim 38 wherein said tucking blade presents a convex configuration.

41. An apparatus as set forth in claim 40 including a frame presenting a plurality of vertical posts interconnected by upper and lower horizontal beams.

42. An apparatus as set forth in claim 38 including a support panel connected to said frame for supporting the panel.

43. An apparatus as set forth in claim 42 wherein said support panel presents an opening defined therein with said opening being smaller than the perimeter of the panel with said pushing devices and said at least one ejector extending through said opening with respect to different tucking modes of said apparatus.

44. An apparatus as set forth in claim 43 including side and corner retaining elements adjustably connected to said support panel and surrounding said opening for holding the panel relative said support panel with said side and corner retaining elements slidably movable relative said opening.

45. An apparatus as set forth in claim 44 wherein said pushing devices are operably connected to said upper horizontal beams and oriented around the perimeter of the panel.

46. An apparatus as set forth in claim 45 including a sensor connected to each of said panel actuators and said tucking actuators for controlling tucking modes of said panel actuators and tucking actuators.

47. An apparatus as set forth in claim 46 including at least one mirror connected to said frame for reflecting images of the panel as said tucking tools move relative to the panel.

48. An apparatus as set forth in claim 47 including a pair of sleeves connected to said lower horizontal beams for receiving a forks of a fork-lift truck.

49. An apparatus as set forth in claim 48 including a device operably connected to said lower horizontal beam with said device pivotably and radially rotatable relative the panel for forming a cavity in the panel and inserting a handle into the cavity of the panel.

\* \* \* \* \*

UNITED STATES PATENT AND TRADEMARK OFFICE
CERTIFICATE OF CORRECTION

PATENT NO.         : 7,406,766 B2
APPLICATION NO. : 10/968505
DATED               : August 5, 2008
INVENTOR(S)      : Michael Levesque et al.

It is certified that error appears in the above-identified patent and that said Letters Patent is hereby corrected as shown below:

In column 9, line 54, please delete the word "suffound" and insert the word --surround--.

In column 10, line 37, please delete the word "suffounding" and insert the word --surrounding--.

In column 11, line 15, please delete "claim 38" and insert --claim 41--.

In column 12, line 17, please delete the first word "a".

Signed and Sealed this

Twenty-first Day of October, 2008

JON W. DUDAS
*Director of the United States Patent and Trademark Office*